US010901634B2

(12) United States Patent
Lingarajappa

(10) Patent No.: US 10,901,634 B2
(45) Date of Patent: Jan. 26, 2021

(54) SELF-HEALING IN A STORAGE SYSTEM WHERE CRITICAL STORAGE GROUP IS REBUILT WITH DIFFERENT RAID GEOMETRY USING REMAINING FUNCTIONING DRIVES (IN THE CRITICAL STORAGE GROUP) THAT HAVE NOT FAILED, AND NOT ALL DATA, DRAINED FROM THE CRITICAL STORAGE GROUP, IS STOPPED IN THE CRITICAL STORAGE GROUP THAT IS REBUILT

(71) Applicant: Seagate Technology LLC, Cupertino, CA (US)

(72) Inventor: Chetan Bendakaluru Lingarajappa, Bangalore (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 117 days.

(21) Appl. No.: 15/870,385

(22) Filed: Jan. 12, 2018

(65) Prior Publication Data
US 2019/0220207 A1 Jul. 18, 2019

(51) Int. Cl.
*G06F 3/06* (2006.01)
(52) U.S. Cl.
CPC .......... *G06F 3/0629* (2013.01); *G06F 3/0617* (2013.01); *G06F 3/0689* (2013.01)
(58) Field of Classification Search
CPC .... G06F 3/0629; G06F 3/0617; G06F 3/0689; G06F 11/1088
See application file for complete search history.

(56) References Cited

U.S. PATENT DOCUMENTS

| | | |
|---|---|---|
| 2003/0120863 A1 | 6/2003 | Lee et al. |
| 2003/0231529 A1* | 12/2003 | Hetrick ............... G06F 11/1092 365/200 |
| 2010/0251012 A1* | 9/2010 | Zwisler ............... G06F 11/1092 714/6.32 |
| 2012/0079318 A1 | 3/2012 | Colgrove et al. |
| 2012/0084506 A1 | 4/2012 | Colgrove et al. |

OTHER PUBLICATIONS

StableBit. Manual [online]. StableBit, Aug. 20, 2016 [retrieved on May 26, 2020]. Retrieved from the Internet: <URL: https://web.archive.org/web/20160820094844/https://stablebit.com/Support/DrivePool/2.X/Manual?Section=Balancing%20Settings>. (Year: 2016).*

* cited by examiner

*Primary Examiner* — William B Partridge
*Assistant Examiner* — Chie Yew
(74) *Attorney, Agent, or Firm* — Holzer Patel Drennan

(57) ABSTRACT

A storage system may include a plurality of logical storage units that each include a plurality of storage devices. One or more logical unit numbers may be stored across one or more of the plurality of logical storage units, and the logical unit numbers may be accessible by one or more host devices. A logical storage unit may include a plurality of storage devices. Upon detection of failure of a storage device of a logical storage unit, data of the logical storage unit is drained to one or more fault tolerant logical storage unit. The logical storage unit with the defective device is converted to a fault-tolerant logical storage unit using the available and non-defective devices. Data is rebalanced across the fault-tolerant logical storage units.

20 Claims, 4 Drawing Sheets

SELF-HEALING IN A STORAGE SYSTEM WHERE CRITICAL STORAGE GROUP IS REBUILT WITH DIFFERENT RAID GEOMETRY USING REMAINING FUNCTIONING DRIVES (IN THE CRITICAL STORAGE GROUP) THAT HAVE NOT FAILED, AND NOT ALL DATA, DRAINED FROM THE CRITICAL STORAGE GROUP, IS STOPPED IN THE CRITICAL STORAGE GROUP THAT IS REBUILT

BACKGROUND

A storage system may include a plurality of logical storage units that each include a plurality of storage devices. One or more logical unit numbers may be stored across one or more of the plurality of logical storage units, and the logical unit numbers may be accessible by one or more host devices. For a variety of different reasons, one or more devices of a logical storage unit may fail and cause the logical storage unit to be in a critical state. In such situations, the failed device may be replaced by a new device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

A method includes detecting a storage device failure in a logical storage unit of a storage array including a plurality of logical storage units. The storage device failure renders the logical storage unit critical. The method further includes draining data from the critical logical storage unit to one or more fault tolerant logical storage units of the plurality of logical storage units responsive to detecting the storage device failure, converting the critical logical storage unit to a fault tolerant logical storage unit by modifying a RAID geometry of the critical logical storage unit based on a number of available discs in the critical logical storage unit, and rebalancing user data of the storage array across the fault tolerant logical storage units of the storage array.

These and various other features and advantages will be apparent from a reading of the following Detailed Description.

BRIEF DESCRIPTIONS OF THE DRAWINGS

DETAILED DESCRIPTION

A storage system may include a plurality of logical storage units that each include a plurality of storage devices. One or more logical unit numbers may be stored across one or more of the plurality of logical storage units, and the logical unit numbers may be accessible by one or more host devices. For a variety of different reasons, one or more devices of a logical storage unit may fail and cause the logical storage unit to be in a critical state. In some implementations, a spare device may be included in the logical storage unit and used to replace the failed device. In some applications, a logical storage unit may comprise a closed box storage array where storage discs (or other media) within the box are difficult to replace upon disc failure. In situations where a spare drive is not available or a failed device is difficult to replace, a critical logical storage unit may be converted to fault tolerant logical storage unit using the available devices. Such conversion may require draining the user data from the critical logical storage unit to other fault-tolerant logical storage units, converting the critical logical storage unit, and rebalancing user data across the fault-tolerant logical storage units. These and other implementations are described further below with respect to the figures.

Figure 1:
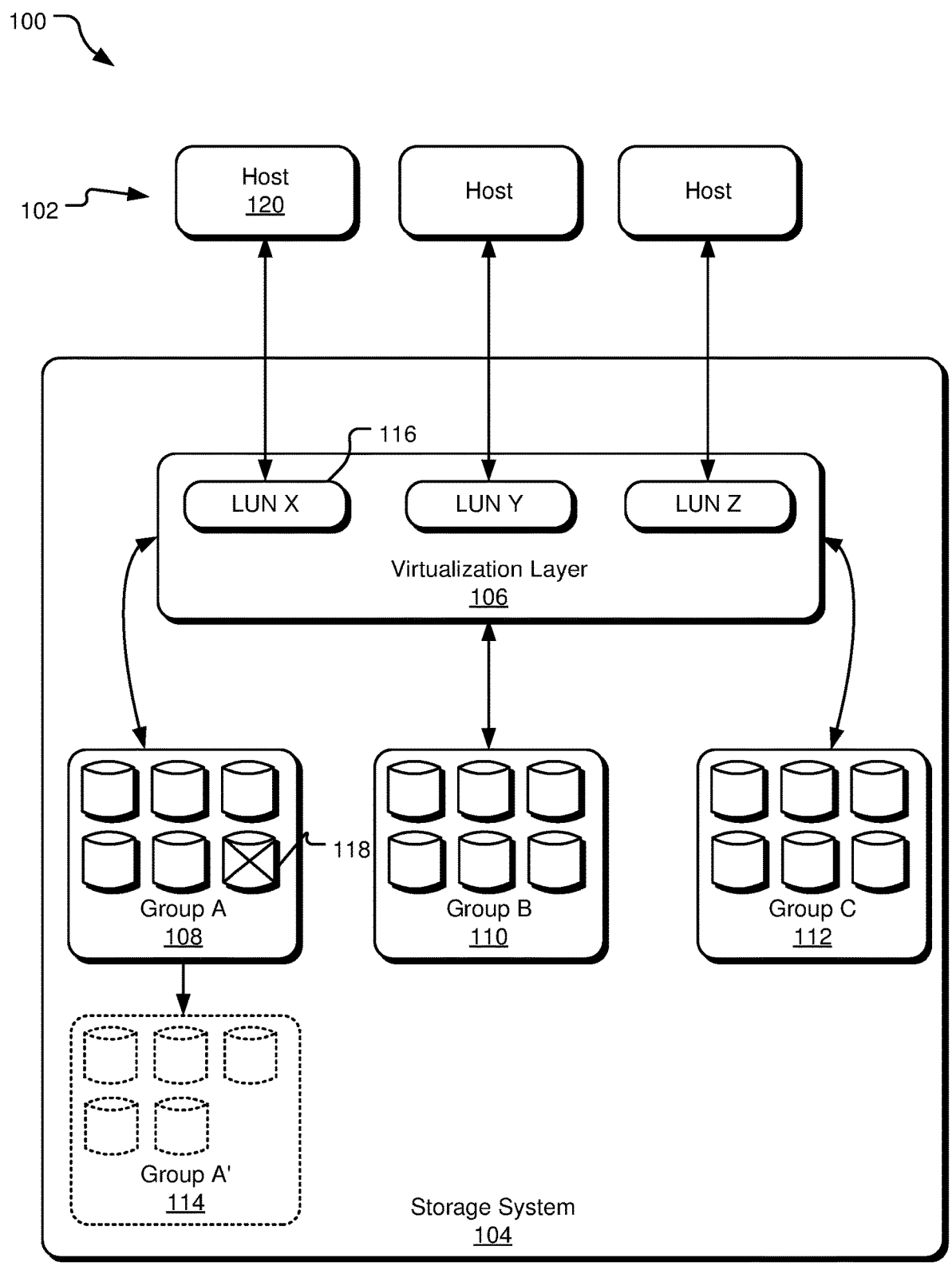
FIG. 1 illustrates a block diagram of an example storage system implementing self-healing.

FIG. 1 illustrates a block diagram 100 of an example storage system 104 implementing self-healing. The storage system 104 includes plurality logical storage units implemented as storage groups of storage media devices. In the illustrated implementation, the storage groups are redundant arrays of independent/inexpensive discs (RAID) groups, but it should be understood that other formats may be utilized. Each group (e.g., a group A 108, group B 110, group C 112) may be referred to as a logical storage unit and may include a plurality of storage surfaces/medias in one or more storage devices such as solid-state drives (SSDs), hard disc drives (HDDs), serial advanced hybrid (SATA) drives, serial attached SCSI (SAS) drives, flash drives, optical disc drives, magnetic disc drives, magnetic tape drives, solid-state hybrid drives (SSHDs), etc. In one example implementation, a storage group consists of a closed box minimal storage array (e.g., a super drive). The logical storage units (e.g., the group A 108, the group B 110, the group c 112) in combination may be referred to as a storage array.

The storage system 104 includes a virtualization layer 106 that abstracts one or more logical units or volumes presented as logical unit numbers (LUNs) (e.g., a LUN 116) that are addressable by one or more host computing devices 102. For example, the LUN X 116 includes a range of logical block addresses (LBAs) that a host device 120 utilizes to store and retrieve data. It should be understood that a host may be allocated more than one LUN and that a particular LUN may be addressable by more than one host. Each of the LUNs may be stored across one or more storage devices of one or more storage groups. For example, the LUN X 116 may include data that is stored in devices of the group A, 108, the group B 110, and the group C 112. The virtualization layer 106 manages the abstraction of the data between the storage groups and the host. The virtualization layer 106 may further provide other data management facilities such as thin provisioning, tiering, balancing, etc.

The storage system includes hardware and/or software for monitoring storage media and/or device operation. Each storage group 108, 110, and 112 may further include hardware and/or software for monitoring storage media/device operational characteristics or parameters. Furthermore, storage groups may include spare discs or other types of storage media that may be utilized upon media failure. Failure may occur do disc surface defects, actuator failures, read/write head failures etc. If a device/drive/media fails in a storage group, the disc group may be given a critical status. In some implementations, a storage group is given a critical status if two drives fail in a RAID 6 storage group or if one drive fails in a RAID 5 storage group. In such circumstances, a spare may be used in to reconstruct the group to a fault tolerant state. However, in some circumstances, a spare is not available, or all spares have been used in a group.

When a storage group is assigned a critical status and no spare media is available for the critical group, the virtualization layer 106 initiates a self-healing process. The virtualization layer 106 determines whether space is available in other fault tolerant (e.g., non-critical) storage groups to store the data of the critical RAID group. If enough space is available, the data from the critical storage group is drained to one or more fault tolerant storage groups based on the available free space. The critical storage group is then deleted and reconstructed as a fault tolerant RAID group with a different format (e.g., RAID geometry) with fewer drives. The data is the rebalanced across the fault-tolerant storage groups. Accordingly, when a storage group is given a critical status and enough free space is available, the storage system 104 reformats the critical group to a fault tolerant group and rebalances data across the fault tolerant group.

As shown in FIG. 1, the storage group A 108 may lose a storage device 118 to a defect/failure. A group or unit manager (not shown) may report the failure to the virtualization layer 106, or the virtualization layer 106 may detect the failure. In one example implementation, the group A 108 is a 5+1 RAID 5 storage group. Because the storage device 118 fails in a 5+1 RAID 5 storage group, the group A 108 is assigned a critical state. In response to the device failure (e.g., the critical state), the virtualization layer 106 first determines whether a spare drive is available in the group A 108. In the illustrated implementation, no spare drives are available. The virtualization layer 106 then determines the amount of data stored in the group A 108. Based on the amount of data stored in the group A 108, the virtualization layer 106 determines whether enough free space is available in other fault tolerant groups (e.g., the group B 110 and the group C 112). The virtualization layer 106 may use a table, translation layer, etc. to determine amount of user data in different storage groups and the available amount of free space for storing user data. If not enough free space is available, then the failed storage device 118 needs to be replaced. If there is enough free space available in other fault tolerant groups, then the user data is drained from the group A 108 and stored in one or more fault tolerant groups (e.g., the group B 110 and the group C 112).

After the user data is evacuated/drained from the critical storage group A 108, the storage group A 108 is deleted and reformatted as a fault tolerant (non-critical) storage group A'. In the illustrated implementation, the group A 108 as a 5+1 RAID 5 storage group is deleted and recreated as the storage group A' as a 4+1 RAID 5 storage group using the drives that did not fail. In other words, the data stripe size for the group is converted to 5+1 to 4+1. After the group A' 114 conversion is complete, user data is rebalanced across the fault tolerant storage groups (e.g., the group A' 114, the group B 110, and the group C 112). In other words, the entirety of the data originally stored in the group A 108 may not be stored to group A' 114 after group A' 114 is converted. Rather, the virtualization layer 106 moves data across the fault tolerant groups. The data may be moved based on read/write heat of the data, read/write heat of a group relative another group, user preferences, etc.

In another example, a storage group is a RAID 6 group with 16 drives implemented in a 14+2 format (e.g., 14 data drives and 2 parity drives per data stripe). The group is deemed critical due to two drive failures. The critical group would be recreated as a 12+2 (12 data drives, 2 parity drives per data stripe) after the user data is drained. Generally, in a RAID 6 group, the group becomes critical when two devices fail and in a RAID 5 group, the group becomes critical when one device fails.

Figure 2:
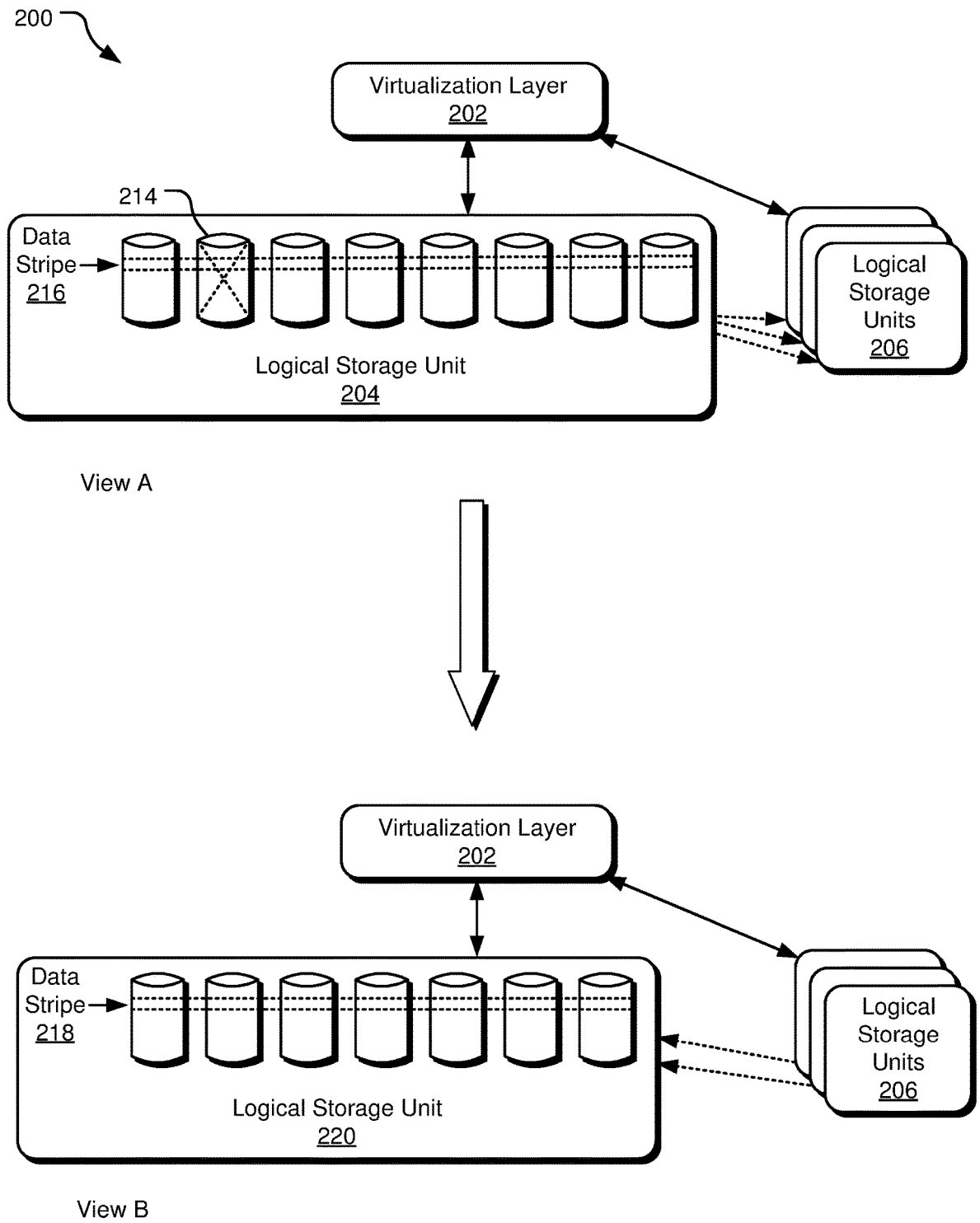
FIG. 2 illustrates another block diagram of an example storage system implementing self-healing.

FIG. 2 illustrates another block diagram 200 of an example storage system implementing self-healing. In a view A of FIG. 2, a storage system includes a virtualization layer 202 and a plurality of logical storage units (e.g., a logical storage unit 204 and logical storage units 206). Each of the logical storage units 204 and 206 may include a plurality of storage devices including, without limitation, solid-state drives (SSDs), hard disc drives (HDDs), serial advanced hybrid (SATA) drives, serial attached SCSI (SAS) drives, flash drives, optical disc drives, magnetic disc drives, magnetic tape drives, and/or solid-state hybrid drives (SSHDs). In some implementations, a logical storage unit is implemented as a closed box minimal storage array (e.g., a super drive). The combination of logical storage units 204 and 206 may be referred to as the storage array.

The virtualization layer 202 abstracts one or more logical units or volumes presented as logical unit numbers (LUNS), which are addressable by one or more host computing devices (not shown). The one or more LUNs may include data that is stored across one or more of the logical storage units 204 and 206.

Each logical storage unit 204 and 206 may be implemented as a RAID group with varying RAID geometries. For example, one of the logical storage units 206 may be implemented as a RAID 6 unit with 16 devices (e.g., 14 data drives and 2 parity drive per data stripe), while another of the logical storage units 206 is implemented as a RAID 6 unit with 9 devices (e.g., 7 data drives and 2 parity drives per data stripe). It should be understood that the illustrated and described implementations are exemplary and that other storage geometries are contemplated.

In the illustrated implementation, the logical storage unit 204 is implemented as a RAID logical storage unit with 8 devices (e.g., a device 214). A data stripe 216 allocated to the logical storage unit 204 may include data sectors in each of the devices of the logical storage unit 204. In a RAID 6 implementation, the data stripe 216 includes sectors in each of the devices including 6 data sectors and 2 parity sectors (e.g., 8 total devices). In a RAID 5 implementation, the data stripe 216 includes sectors in each of the devices including 7 data sectors and 1 parity sector. Other geometries of the data stripe 216 are contemplated.

The device 214 of the logical storage unit 204 may fail due to, for example without limitation, a surface defect, actuator defect, data communication defect, or read/write head defect. The defect causes the logical storage unit 204 to be in a critical state. Critical status means, for example, if another drive fails, then some or all user data of the logical storage unit may be lost if another device of the logical storage unit 204 fails. The defect is detected by or reported to the virtualization layer 202. Responsive to detecting the defect, the virtualization layer 202 determines ether the logical storage unit 204 has a spare device to replace the failed device 214. After determining that no spare devices are available, the virtualization layer 202 determines the amount of user data stored in the critical logical storage unit 204. The virtualization layer 202 then determines whether enough free space is available in the other logical storage units 206 (which are fault-tolerant) to store the user data of the logical storage unit 204. If enough free space is available the virtualization layer 202 moves (e.g., drains) the user data from the logical storage unit 204 to the fault tolerant logical storage units 206. The virtualization layer 202 handles the movement and documentation of user data as is associated with a LUN.

The virtualization layer 202 then reformats the logical storage unit 204 using the available (e.g., non-defective) drives of the logical storage unit 204. Such reformatting may include deleting the logical storage unit 204 then reconstructing a new logical storage unit using the available drives. In view B, a new logical storage unit 220 is reconstructed using the available devices (e.g., 7 devices) of the previous logical storage unit 204. A data stripe 218 of the new logical storage unit 220 is allocated to the 7 devices. In a RAID 6 implementation, the data stripe includes 5 data sectors and 2 parity sectors (e.g., 7 devices). In a RAID 5 implementation, the data stripe includes 6 data sectors and 1 parity sector across the 7 devices. After the new logical storage unit 220 is reconstructed, the data of the logical storage units 206 is rebalanced across the logical storage units 206 and the new logical storage unit 220. The rebalancing may account for data heat, user preferences, etc.

Figure 3:
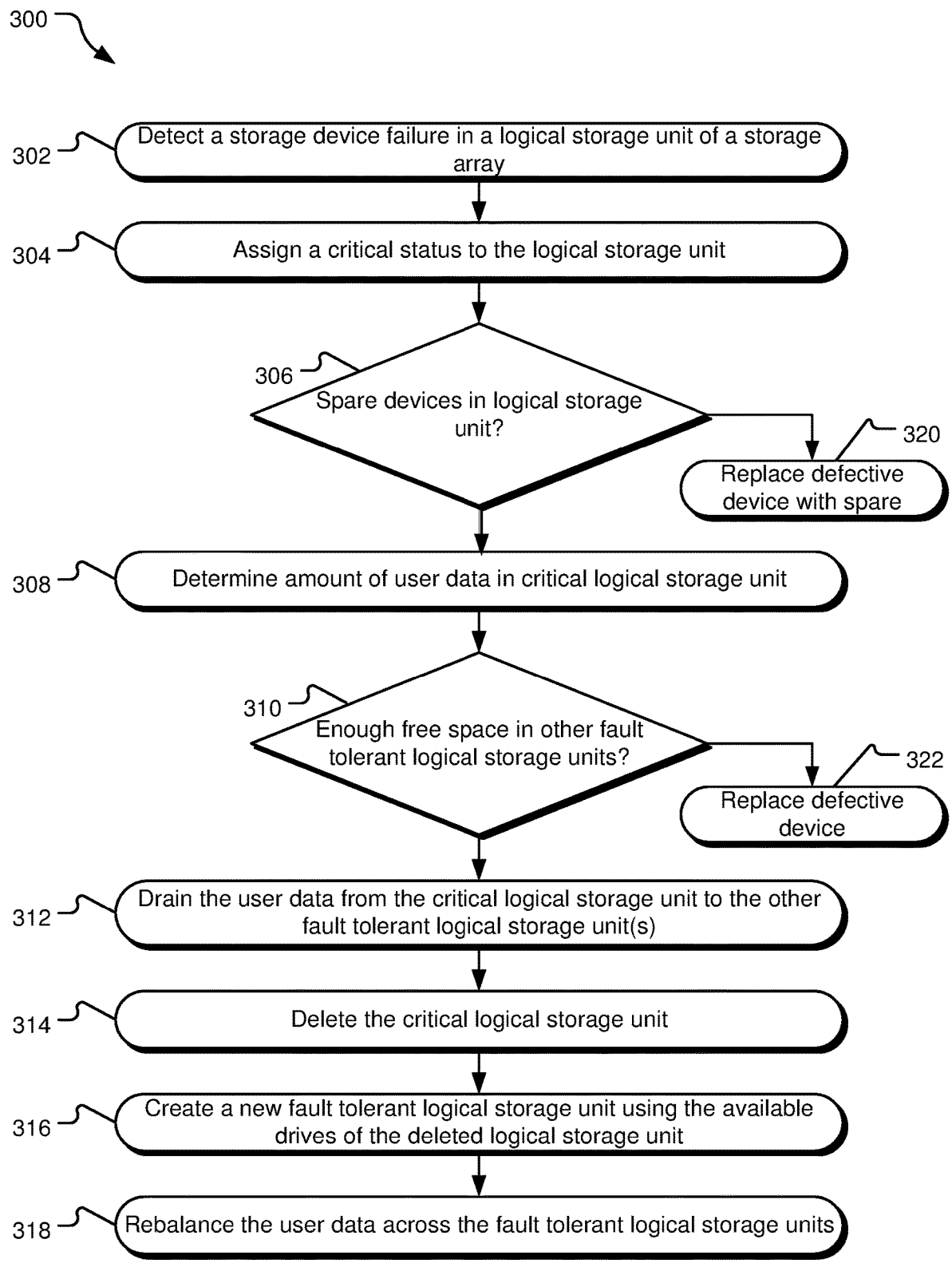
FIG. 3 illustrates example operations for self-healing in a storage system.

FIG. 3 illustrates example operations 300 for self-healing in a storage system. The operations may be performed by a virtualization layer of storage system. A detecting operation 302 detects a storage device failure in a logical storage unit of a storage system. The logical storage unit may be a RAID storage group or another type of group. An assigning operation 304 assigns a critical status to the logical storage unit. The assigning operation 304 may be performed based on the amount of available space, the particular storage format (e.g., RAID geometry) utilized by the logical storage unit, etc. A determining operation 306 determines whether the critical logical storage unit includes any spare devices. If a spare device is available, a replacing operation 320 replaces the defective (e.g., failed) device with the spare included it the logical storage unit. The replacing operation 320 may be automatically performed by the logical storage unit or may be managed by a virtualization layer.

If no spare drives are available for the critical logical storage unit, then a determining operation 308 determines an amount of user data stored in the critical logical storage unit. Another determining operation 310 determines whether enough free space is available in other fault tolerant logical storage units to store the mount of user data in the critical logical storage unit. If the storage system does not have enough free space available to store the user data of the logical storage unit, then a replacing operation 322 replaces the defective device. The replacing operation 322 may be performed by a system administrator by physically removing and replacing the defective device. If the logical storage unit is implemented as a closed box minimal storage array, then the whole logical storage unit may be replaced.

If there is enough free space available, then a draining operation drains the user data from the critical logical storage unit to the other fault tolerant logical storage units. The data may be stored in a single fault tolerant logical storage units or across multiple fault-tolerant logical storage units. A deleting operation 314 deletes the critical logical storage unit. A creating operation 316 creates a new fault tolerant logical storage unit using the available drives of the deleted logical storage unit. In other words, the deleting operation 314 and the creating operation 316 comprise a converting operation, where the critical logical data unit is converted to a new fault tolerant logical storage unit. The converting operation may comprises modifying the RAID geometry by reducing the stripe size of a RAID group storage array (e.g., 7+1 to 6+1). Other methods of changing the logical storage unit geometry are contemplated. A rebalancing operation 318 rebalances the user data across the fault tolerant logical storage units. The rebalancing operation 318 may be based on the amount of data in each logical storage unit, read/write heat in the logical storage units, etc.

Figure 4:
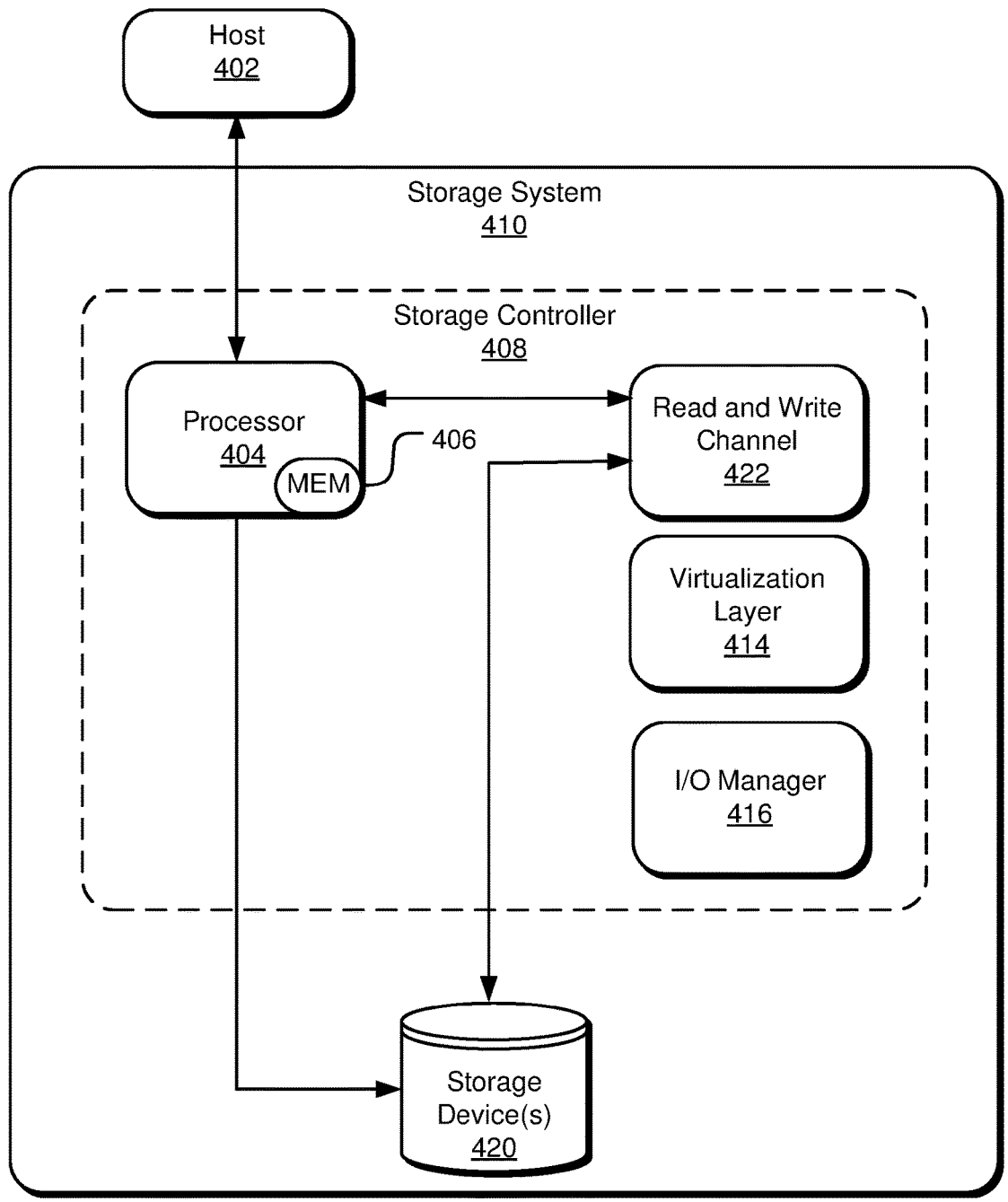
FIG. 4 illustrates a schematic of an example storage controller of a storage system.

FIG. 4 illustrates an example schematic 400 of a storage controller 408 of a storage system 410. Specifically, FIG. 4 shows one or more functional circuits that are resident on a printed circuit board used to control the operation of the storage system 410. The storage controller 408 may be operably and communicatively connected to a host computer 402, which may include the storage system 410 or may be separate from the storage system. Control communication paths are provided between the host computer 402 and a processor 404. Control communication paths are provided between the processor 404 and one or more storage devices 420 (e.g., logical storage units) via a number of read/write channels (e.g., read and write channel 422). The processor 404 generally provides top-level communication and control for the storage controller 408 in conjunction with processor-readable instructions for the processor 404 encoded in processor-readable storage media (e.g., a memory 406). The processor readable instructions further include instructions for performing self-healing, tiering, thin-provisioning, etc.

The term "processor-readable storage media" includes but is not limited to, random access memory ("RAM"), ROM, EEPROM, flash memory or other memory technology, CDROM, digital versatile discs (DVD) or other optical disc storage, magnetic cassettes, magnetic tape, magnetic disc storage or other magnetic storage devices, or any other tangible medium which can be used to store the desired information and which can be accessed by a processor. In contrast to tangible processor-readable storage media, intangible processor-readable communication signals may embody processor-readable instructions, data structures, program modules or other data resident in a modulated data signal, such as a carrier wave or other signal transport mechanism.

The storage controller 408 controls storage of data on the storage devices 420 (e.g., logical storage units) such as HDDs, SSD, SSHDs, flash drives, SATA drives, disc arrays, etc. Each of the storage devices may include spindle motor control circuits for controlling rotation of media (e.g., discs) and servo circuits for moving actuators between data tracks of storage media of the storage devices 420.

Other configurations of storage controller 408 are contemplated. For example, storage controller 408 may include one or more of an interface circuitry, a buffer, a disc drive, associated device peripheral hardware, an encryption unit, a compression unit, a replication controller, etc. The storage controller 408 includes a virtualization layer 414 that detects device failures, determines data allocation, moves data for self-healing, etc. The storage controller 408 manages read/write operations, caching, etc. of the storage system 410. The virtualization layer 414 and the I/O manager 416 may be embodied in processor-readable instructions stored in the memory 406 (a processor-readable storage media) or another processor-readable memory.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disc media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
    draining data from a critical storage group of a storage array, the critical storage group including a first plurality of storage devices in a first RAID storage group, to one or more fault tolerant storage groups of the storage array, the one or more fault tolerant storage groups at least including a second plurality of storage devices in a second RAID storage group, responsive to detecting a failed storage device of the first RAID storage group in the critical storage group, the critical storage group and the one or more fault tolerant storage groups are each separate RAID storage groups;
    converting the critical storage group to a reconstructed fault tolerant storage group by deleting all data from the first RAID storage group and modifying a RAID geometry of the first plurality of storage devices that have not failed to create a new RAID storage group for the reconstructed fault tolerant storage group comprising the first plurality of storage devices without the failed storage device; and
    rebalancing the data of the storage array across the one or more fault tolerant storage groups and the reconstructed fault tolerant storage group of the storage array, wherein not all of the data originally stored in the first RAID storage group is stored in the new RAID storage group for the reconstructed fault tolerant storage group.

2. The method of claim 1 further comprising:
    selecting the one or more fault tolerant storage groups for draining the data from the critical storage group based on an amount of available free space in the one or more fault tolerant storage groups.

3. The method of claim 1 wherein modifying the RAID geometry of the first plurality of storage devices that have not failed further comprises:
    reducing a stripe size associated with the critical storage group based on the number of available devices.

4. The method of claim 1 further comprising:
    determining an amount of available free space in the one or more fault tolerant storage groups before the draining of the data from the critical storage group.

5. The method of claim 1 wherein the critical storage group is assigned a critical status responsive to detection of the storage device failure.

6. The method of claim 1 further comprising:
    maintaining a RAID level assigned to the critical storage group while converting the critical storage group to the reconstructed fault tolerant storage group.

7. The method of claim 1, further comprising:
    updating an abstraction of the critical storage group by a virtualization layer such that the data drained from the critical storage group is accessible to a host in operative communication with the virtualization layer to access the data in one or more fault tolerant storage groups.

8. A storage system comprising:
    a memory;
    one or more hardware processors; and
    a virtualization layer stored in the memory and executable by the one or more hardware processors to:
        drain data from a critical storage group of a storage array, the critical storage group including a first plurality of storage devices in a first RAID storage group, to one or more fault tolerant storage groups of the storage array, the one or more fault tolerant storage groups at least including a second plurality of storage devices in a second RAID storage group, responsive to detecting a failed storage device of the first RAID storage group in the critical storage group,
        convert the critical storage group to a reconstructed fault tolerant storage group by deleting all data from the first RAID storage group,
        modify a RAID geometry of the first plurality of storage devices that have not failed to create a new RAID storage group for the reconstructed fault tolerant storage group comprising the first plurality of storage devices without the failed storage device, and
        rebalance the data of the storage array across the one or more fault tolerant storage groups and the reconstructed fault tolerant storage group of the storage array, wherein not all of the data originally stored in the first RAID storage group is stored in the new RAID storage group for the reconstructed fault tolerant storage group;
    wherein the critical storage group and the one or more fault tolerant storage groups are each separate RAID storage groups.

9. The storage system of claim 8 wherein the virtualization layer is further executable by the one or more hardware processors to select the one or more fault tolerant storage groups for draining the data from the critical storage group based on an amount of available free space in the one or more fault tolerant storage groups.

10. The storage system of claim 8 wherein modifying the RAID geometry of the first plurality of storage devices that have not failed includes reducing a stripe size associated with the critical storage group based on the number of available devices in the critical storage group.

11. The storage system of claim 8 wherein the virtualization layer is further executable by the one or more hardware processors to determine an amount of available free space in the one or more fault tolerant storage groups before the draining of the data from the critical storage group.

12. The storage system of claim 8 wherein the critical storage group is assigned a critical status responsive to detection of the storage device failure.

13. The storage system of claim 8 wherein a RAID level assigned to the critical storage group is maintained while converting the critical storage group to the reconstructed fault tolerant storage group.

14. The storage system of claim 8, wherein the virtualization layer is further executable by the one or more hardware processors to update an abstraction of the critical storage group by the virtualization layer such that the data drained from the critical storage group is accessible to a host in operative communication with the virtualization layer to access the data in one or more fault tolerant storage groups.

15. One or more tangible processor-readable storage media encoding processor-executable instructions for executing on a computer system a process to improve the computer system comprising:
  draining data from a critical storage group of a storage array, the critical storage group including a first plurality of storage devices in a first RAID storage group, to one or more fault tolerant storage groups of the storage array, the one or more fault tolerant storage groups at least including a second plurality of storage devices in a second RAID storage group, responsive to detecting a failed storage device of the first RAID storage group in the critical storage group, the critical storage group and the one or more fault tolerant storage groups are each separate RAID storage groups;
  converting the critical storage group to a reconstructed fault tolerant storage group by deleting all data from the first RAID storage group and modifying a RAID geometry of the first plurality of storage devices that have not failed to create a new RAID storage group for the reconstructed fault tolerant storage group comprising the first plurality of storage devices without the failed storage device; and
  rebalancing the data of the storage array across the one or more fault tolerant storage groups and the reconstructed fault tolerant storage group of the storage array, wherein not all of the data originally stored in the first RAID storage group is stored in the new RAID storage group for the reconstructed fault tolerant storage group.

16. The one or more processor-readable storage media of claim 15 further comprising:
  selecting the one or more fault tolerant storage groups for draining the data from the critical storage group based on an amount of available free space in the one or more fault tolerant storage groups.

17. The one or more processor-readable storage media of claim 15 wherein modifying the RAID geometry of the first plurality of storage devices that have not failed further comprises:
  reducing a stripe size associated with the critical storage group to account for the storage device failure.

18. The one or more processor-readable storage media of claim 15, the computer process further comprising:
  determining an amount of available free space in the one or more fault tolerant storage groups before the draining of the data from the critical storage group.

19. The one or more processor-readable storage media of claim 15 wherein the critical storage group is assigned a critical status responsive to detection of the storage device failure.

20. The one or more processor-readable storage media of claim 15, the computer process further comprising:
  updating an abstraction of the critical storage group by a virtualization layer such that the data drained from the critical storage group is accessible to a host in operative communication with the virtualization layer to access the data in one or more fault tolerant storage groups.

* * * * *